(12) United States Patent
Stares et al.

(10) Patent No.: US 9,346,353 B2
(45) Date of Patent: May 24, 2016

(54) VEHICLE CONTROLLER FOR CHANGING THE NUMBER OF DRIVEN WHEELS

(75) Inventors: Pete Stares, Whitley (GB); Ian Beverley, Whitley (GB); Shaun Wick, Solihull (GB); Russell Percy Osborn, Warwick (GB); Paul Beever, Rugby (GB); Sam Anker, Coventry (GB); Bruce Buckley, Lower Quinton (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 8 days.

(21) Appl. No.: 14/000,394

(22) PCT Filed: Feb. 20, 2012

(86) PCT No.: PCT/EP2012/052853
§ 371 (c)(1),
(2), (4) Date: Oct. 28, 2013

(87) PCT Pub. No.: WO2012/110660
PCT Pub. Date: Aug. 23, 2012

(65) Prior Publication Data
US 2014/0067219 A1 Mar. 6, 2014

(30) Foreign Application Priority Data
Feb. 18, 2011 (GB) .................................. 1102825.5

(51) Int. Cl.
*B60K 23/08* (2006.01)
*B60K 17/34* (2006.01)
(Continued)

(52) U.S. Cl.
CPC ................. *B60K 23/08* (2013.01); *B60K 17/34* (2013.01); *B60K 17/35* (2013.01); *B60W 10/02* (2013.01);
(Continued)

(58) Field of Classification Search
CPC ................. B60K 17/35; B60K 23/08; B60K 2023/0858; B60W 50/0097
See application file for complete search history.

(56) References Cited

U.S. PATENT DOCUMENTS

| | | |
|---|---|---|
| 4,712,635 A | 12/1987 | Sumiya et al. |
| 5,019,985 A | 5/1991 | Yasuno et al. |

(Continued)

FOREIGN PATENT DOCUMENTS

| | | |
|---|---|---|
| EP | 0818342 A2 | 1/1998 |
| GB | 2104178 A | 3/1983 |

(Continued)

OTHER PUBLICATIONS

International Search Report for PCT/EP2012/052853 dated Jul. 23, 2012, 5 pages.

(Continued)

*Primary Examiner* — Todd Melton
(74) *Attorney, Agent, or Firm* — Reising Ethington P.C.

(57) ABSTRACT

A motor vehicle having: a prime mover; first and second groups of one or more wheels; and a driveline to connect the prime mover to the first and second groups of wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect the second group of one or more wheels to the prime mover when the driveline transitions between the first mode and the second mode, wherein when in the first mode the driveline is operable to transition to the second mode responsive to an output of a reactive evaluator and a predictive evaluator.

32 Claims, 2 Drawing Sheets

(51) Int. Cl.
    *B60K 17/35*     (2006.01)
    *B60W 10/02*     (2006.01)
    *B60W 30/18*     (2012.01)
    *B60W 50/00*     (2006.01)

(52) U.S. Cl.
    CPC ..... *B60K 23/0808* (2013.01); *B60K 2023/0858* (2013.01); *B60W 30/18172* (2013.01); *B60W 50/0097* (2013.01); *B60W 2050/0008* (2013.01); *B60W 2050/0012* (2013.01); *B60W 2520/20* (2013.01); *B60W 2520/263* (2013.01); *B60W 2520/266* (2013.01); *B60W 2710/021* (2013.01); *B60W 2720/403* (2013.01); *Y02T 10/84* (2013.01)

(56) References Cited

U.S. PATENT DOCUMENTS

| | | | |
|---|---|---|---|
| 5,570,755 | A | 11/1996 | Fruhwirth et al. |
| 5,803,197 | A | 9/1998 | Hara et al. |
| 5,950,750 | A * | 9/1999 | Dong et al. ............. 180/24.09 |
| 5,980,415 | A | 11/1999 | Showalter |
| 6,834,225 | B1 | 12/2004 | Jiang et al. |
| 7,124,850 | B2 * | 10/2006 | Lee et al. ............. 180/248 |
| 2003/0168274 | A1 | 9/2003 | Lee et al. |
| 2009/0032322 | A1 | 2/2009 | Ginther |
| 2010/0248888 | A1 | 9/2010 | Hamperl et al. |
| 2010/0250056 | A1 | 9/2010 | Perkins |
| 2010/0262326 | A1 * | 10/2010 | Buszek et al. ............. 701/29 |
| 2012/0095659 | A1 * | 4/2012 | Rodrigues et al. ............. 701/69 |

FOREIGN PATENT DOCUMENTS

| | | | |
|---|---|---|---|
| GB | 2407804 | A | 5/2005 |
| JP | S6259136 | A | 3/1987 |
| JP | S6274720 | A | 4/1987 |
| JP | H01114533 | A | 5/1989 |
| JP | H03258620 | A | 11/1991 |
| JP | H05131856 | A | 5/1993 |
| JP | H0796762 | A | 4/1995 |
| JP | H10272955 | A | 10/1998 |
| JP | 2003312303 | A | 11/2003 |
| JP | 2007223588 | A | 9/2007 |
| JP | 2008062929 | A | 3/2008 |
| WO | WO2011107222 | A1 | 9/2011 |

OTHER PUBLICATIONS

Translation of portions of Japanese Office Action corresponding to Japanese Patent Application No. 2013-553961, dated Jul. 29, 2014 (4 pages).
GB Combined Search and Examination Report for corresponding application No. 1102825.5, dated May 27, 2011, 6 pages.
GB Combined Search and Examination Report for corresponding application No. 1202811.4, dated Jun. 21, 2012, 7 pages.

* cited by examiner

_US 9,346,353 B2_

VEHICLE CONTROLLER FOR CHANGING THE NUMBER OF DRIVEN WHEELS

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

It is desirable to provide a vehicle having improved response time in triggering the transition from the two wheel drive to four wheel drive modes. It is further desirable to provide a vehicle having improved noise, vibration and harshness (NVH) performance in respect of the transition between the two wheel drive and four wheel drive modes.

STATEMENT OF THE INVENTION

Embodiments of the invention may be understood by reference to the appended claims.

Aspects of the invention provide a system, a vehicle and a method.

In a further aspect of the invention for which protection is sought there is provided a motor vehicle having:
  prime mover means;
  at least first and second groups of one or more wheels; and
  a driveline operable to connect the prime mover means to the first and second groups of one or more wheels such that the first group and not the second group of one or more wheels is driven by the prime mover means when the driveline is in a first mode of operation and the first and second groups are driven by the prime mover means when the driveline is in a second mode of operation,
  the driveline including an auxiliary portion comprising releasable torque transmitting means by means of which the driveline is operable to connect the second group of one or more wheels to the prime mover means when the driveline transitions from the first mode to the second mode,
  wherein when in the first mode the driveline is operable to transition to the second mode responsive to an output of a reactive evaluator and a predictive evaluator,
  the output of the reactive evaluator being responsive to a determination whether an amount of wheel slip has exceeded a first prescribed threshold,
  the output of the predictive evaluator being responsive to a determination whether one or more conditions in respect of one or more vehicle operating parameters are met when the amount of wheel slip is below the first prescribed threshold.

Within this application, the term "responsive to" is not intended to be limiting and may be substituted, for example, by the term "dependent on" or other similar terms.

It is to be understood that reference herein to a group of one or more wheels includes reference to a group having a membership of only one wheel.

Embodiments of the present invention have the advantage that a vehicle may transition from the first mode to the second mode either as soon as a condition requiring a transition arises (responsive to the output of the reactive evaluator) or, in some cases, in advance of the existence of one or more conditions that would trigger the reactive evaluator to trigger the transition. In other words, the predictive evaluator may trigger a transition to the second mode in advance of conditions occurring that would cause the reactive evaluator to trigger a transition to the second mode.

Thus it is to be understood that in some situations, by the time conditions actually occur that would normally trigger a transition to the second mode (responsive to the output of the reactive evaluator) the vehicle may already have made the transition to the second mode responsive to the output of the predictive evaluator.

In some situations, by performing a transition to the second mode in anticipation of conditions requiring the transition to the second mode actually occurring, occurrence of the conditions requiring the transition to the second mode may be averted. For example, if the predictive evaluator determines that a risk of wheel slip exists the vehicle may transition to the second mode in advance of wheel slip occurring thereby preventing wheel slip.

Some embodiments have the advantage that wear or one or more components of the vehicle may be reduced. For example if wheel slip is prevented or reduced, wear of one or more tyres may be reduced as well as wear of one or more other components of the driveline.

Thus it is to be understood that the reactive evaluator is arranged to provide a feedback signal indicating that a transition to the second mode is required responsive to conditions that currently exist.

In some arrangements the predictive evaluator may be considered to provide a feed-forward signal indicating that a transition to the second mode may soon be triggered by the reactive evaluator unless the vehicle pre-empts the reactive evaluator by assuming the second mode immediately. Thus in some circumstances the predictive evaluator may trigger a transition to the second mode ahead of the reactive evaluator.

In an embodiment the output of the predictive evaluator may be further responsive to a determination that one or more conditions in respect of one or more vehicle operating parameters are met indicating that the amount of wheel slip may be about to exceed a second prescribed threshold.

Optionally the output of the predictive evaluator may be further responsive to a determination that one or more conditions in respect of one or more vehicle operating parameters are met indicating that a passenger discomfort parameter may be about to exceed a prescribed threshold.

The passenger discomfort parameter may be a parameter indicative of a level of discomfort suffered by a passenger. The higher the value, the greater the level of discomfort suffered. The discomfort parameter may be responsive to an amount of lateral and/or longitudinal acceleration of a vehicle, an amount of yaw rate error. The discomfort parameter may be responsive to one or more other parameters in addition or instead.

The second threshold may be substantially equal to the first threshold.

Alternatively the second threshold may be less than the first threshold.

In an embodiment the amount of wheel slip includes the amount of lateral wheel slip.

Optionally the amount of wheel slip includes the amount of longitudinal wheel slip.

In an embodiment the amount of wheel slip is determined according to a combination of the amount of lateral wheel slip and the amount of longitudinal wheel slip.

Optionally the predictive evaluator is arranged to determine a likelihood that a transition from the first mode to the second mode will be required within a prescribed period of time based on the value of the one or more vehicle operating parameters.

The predictive evaluator may be responsive to one or more historical values of the one or more parameters.

Thus the predictive evaluator may take into account historical values of one or more operating parameters such as parameters responsive to suspension activity, lateral acceleration and/or any other suitable vehicle parameters in determining a likelihood of a transition from the first mode to the second mode being required.

In an embodiment when a transition from the first mode to the second mode is made responsive to the output of the predictive evaluator the releasable torque transmitting means is arranged to connect the second group of wheels to the prime mover means at a rate responsive to the value of the one or more vehicle operating parameters responsive to which the predictive evaluator has triggered the transition.

It is to be understood that the rate of connection of the second group of one or more wheels to the torque transmission path from the prime mover means by the auxiliary portion of the driveline may be considered to relate to a time period within which a connect operation is performed. The higher the rate of connection, the smaller the time period over which the driveline completes an operation in which driveline transitions from the first mode to the second mode. Thus reference to a connect rate may be alternatively considered to be reference to a time period within which a connect operation is completed, i.e. a time period within which a transition from the first mode to the second mode may be completed. By completed is meant that the releasable torque transmitting means has completed an operation in which the second group of one or more wheels is connected to the prime mover means. In the case where the releasable torque transmission means comprise clutch means, completion is understood to mean that the clutch means is fully (and not partially) closed.

Thus, the control means may be operable to control the driveline to transition from the first mode to the second mode over a time period the length of which is responsive to the value of the one or more vehicle operating parameters.

In some embodiments where the releasable torque transmitting means comprises a clutch or clutch means, reference to a connect rate may be understood as reference to a rate of closure of the clutch or clutch means. In some embodiments reference to a connect rate may be understood as reference to a total time taken for a plurality of clutch means to fully close; for example a time delay between closure of one clutch means and closure of another clutch means may be changed, resulting in a different connect rate. In some arrangements it may be advantageous to close clutch means of one of the first and second releasable torque transmitting means before closing the clutch means of the other of the first and second releasable torque transmitting means in order to spin up the prop shaft before the other clutch means is closed. This can reduce noise, vibration and/or harshness (NVH) associated with driveline connect operations. However where a connect operation is urgent, the clutch means of the first and second releasable torque transmitting means may be closed substantially simultaneously or one immediately after the other with little or no delay between the respective closure operations.

That is, the releasable torque transmitting means may be arranged to perform to completion a connect operation over a period of time the length of which is responsive to the output of the predictive evaluator.

It is to be understood that faster rates of transition from the first mode to the second mode (resulting in reduced required time periods to complete a connect operation) may result in increased wear of components of the vehicle and increased NVH (i.e. a reduced NVH performance). By selecting a connect rate that is responsive to the value of the one or more operating parameters triggering the transition, slower rates may be used in some circumstances and faster rates in others. Thus some embodiments of the invention have the advantage that a rate of wear of components of the vehicle may be reduced and/or NVH performance improved.

Optionally the output of the predictive evaluator is responsive to a plurality of vehicle operating parameters.

Further optionally the releasable torque transmitting means is arranged to connect the second group of wheels to the prime mover means at a rate responsive to the identity of the one or more operating parameters responsive to which the output of the predictive evaluator triggered the vehicle to transition from the first mode to the second mode.

The predictive evaluator may be configured to provide an output corresponding to a required mode of operation of the driveline.

In an embodiment when the predictive evaluator provides an output indicating that the second mode of the driveline should be assumed the predictive evaluator is further configured to provide an output corresponding to the identity of the one or more operating parameters responsive to which the predictive evaluator has provided the output indicating that the second mode should be assumed.

This has the advantage that the transition to the second mode may be made at a rate that is responsive to the identity of the triggering parameter. This allows a faster rate to be employed where the identity of the triggering parameter is such that the transition should be performed more urgently.

Optionally when the predictive evaluator determines that the second mode should be assumed the predictive evaluator is arranged to provide an output indicative of a rate at which the transition from the first mode to the second mode should be made.

This has the advantage that the controller 40 does not need to make a separate determination of the required rate of transition from the first mode to the second mode. Rather, the controller 40 controls the vehicle to transition from the first mode to the second mode responsive to the output of the predictive evaluator.

This has the advantage that a speed at which the vehicle can begin the transition from the first mode to the second mode may be increased in some embodiments. This in turn has the advantage of reducing the probability that the vehicle will be found in the first mode when vehicle operating parameters are such that vehicle operation in the second mode is demanded by the reactive evaluator.

The predictive evaluator may be configured to provide an output corresponding to a likelihood that a transition from the first mode to the second mode will be required.

The output may comprise a probability value being a value corresponding to a probability that a transition from the second mode to the first mode will be required within a prescribed time period.

In an embodiment the vehicle is arranged to perform the transition from the first mode to the second mode at a slower rate when the transition to the second mode is made responsive to the output of the predictive evaluator compared with a transition made responsive to the output of the reactive evaluator.

This feature has the advantage that an amount of wear of components of the driveline may be reduced compared with a vehicle not having a predictive evaluator.

As noted above, if a transition to the second mode is made responsive to the output of a predictive evaluator when conditions otherwise demanding a transition to the second mode do not exist, the transition may be made at a rate slower than in the case that the conditions do exist.

This is because even if a transition to the second mode is made responsive to the output of the predictive evaluator at a slower rate, in some circumstances it is likely that the vehicle will be in the second mode at a time earlier than that which would be the case if the transition to the second mode were made at a higher rate responsive to the output of the reactive evaluator.

The transition to the second mode may therefore be made earlier in some circumstances than it would otherwise have been made, reducing wear of the vehicle and reducing a risk that NVH is compromised by performing the transition at a higher rate.

In an embodiment the reactive evaluator is responsive to at least one vehicle operating parameter selected from amongst:
  (a) an amount of wheel slip,
  (b) a yaw rate error,
  (c) a determination whether an antilock braking system (ABS) is active;
  (d) a determination whether a dynamic stability control (DSC) system is active; and
  (e) a determination whether a traction control system (TCS) is active.

In an embodiment the predictive evaluator is responsive to at least one vehicle operating parameter selected from amongst:
  (a) an instantaneous amount of torque being delivered through the driveline to one or more wheels,
  (b) a steering wheel angle,
  (c) a steerable road wheel angle,
  (d) a rate of change of steerable road wheel angle,
  (e) a rate of change of steering wheel,
  (f) a lateral acceleration of the vehicle,
  (g) a rate of change of lateral acceleration,
  (h) a throttle or accelerator pedal position,
  (i) a rate of change of throttle or accelerator pedal position,
  (j) a driver demanded torque,
  (k) a prime mover means torque,
  (l) an amount of wheel slip,
  (m) a vehicle acceleration,
  (n) a vehicle deceleration,
  (o) a yaw rate,
  (p) a yaw rate error,
  (q) a gear shift position value of a manual or automatic gear shift control,
  (r) an operating temperature,
  (s) an ambient temperature,
  (t) a temperature of a vehicle component,
  (u) a temperature of a vehicle fluid,
  (v) a temperature of a component of the auxiliary driveline,
  (w) a temperature of a fluid of the auxiliary driveline,
  (x) a speed of the vehicle,
  (y) the identity of a vehicle operating program being executed by the vehicle,
  (z) a roughness of a driving surface over which the vehicle is moving,
  (a1) a current or target gear of an automatic transmission is set to one of a first set of one of one or more gear values,
  (b1) a brake pedal position value is greater than a first prescribed brake pedal position threshold, and
  (c1) a brake pressure value is greater than a first prescribed brake pressure threshold.

Optionally the auxiliary portion of the driveline comprises a prop shaft and the releasable torque transmitting means comprises first releasable torque transmitting means operable to connect the prop shaft to a torque transmission path from the prime mover means and the second releasable torque transmitting means is operable to connect the prop shaft to the second group of one or more wheels.

Optionally the vehicle further comprises control means operable to switch the vehicle between the first and second modes of operation such that in the first mode the first and second releasable torque transmission means disconnect the prop shaft from both the torque transmission path to the prime mover means and the second group of wheels.

It is to be understood that when the prop shaft is disconnected from both the torque transmission path from the prime mover means and said second group of one or more wheels the prop shaft may be substantially stationary even when the vehicle is moving. This has the advantage that energy losses associated with prop shaft rotation may be reduced or eliminated in some embodiments.

Optionally the first group of wheels comprises a first pair of wheels and the first mode corresponds to a two wheel drive mode of operation wherein the first pair of wheels are driven by the prime mover means.

Further optionally the second group of wheels comprise a second pair of wheels and the second mode of operation corresponds to a four wheel drive mode of operation.

Still further optionally the second group of wheels comprises a second and a third pair of wheels and the second mode of operation corresponds to a six wheel drive mode of operation.

In an embodiment at least one of the first and second groups of wheels comprises a plurality of pairs of wheels.

Optionally the releasable torque transmitting means comprises one or more actuators arranged to perform the connection operation, the connection operation rate being dependent on a rate of movement of the one or more actuators.

In an embodiment the releasable torque transmitting means comprises a plurality of actuators arranged to perform the connection operation.

In an embodiment the prime mover means comprises at least one selected from amongst an internal combustion engine and an electric propulsion motor.

In a further aspect of the invention there is provided a method of controlling a motor vehicle having a driveline comprising:

in a first mode of operation of the driveline, coupling a first group of one or more wheels and not a second group to prime mover means by means of the driveline, in a second mode of operation of the driveline, coupling the second group of one or more wheels to the prime mover means in addition to the first group by means of an auxiliary portion of the driveline, when the driveline is in the first mode the method comprising controlling the driveline to transition to the second mode responsive to an output of a reactive evaluator and a predictive evaluator, the method comprising determining by means of the reactive evaluator whether an amount of wheel slip has exceeded a first prescribed threshold and controlling the driveline to assume the second mode if the amount of wheel slip has exceeded the first prescribed threshold, and determining by means of the predictive evaluator whether one or more conditions in respect of one or more vehicle operating parameters are met when the amount of wheel slip is below the first prescribed threshold.

In an embodiment the step of determining by means of the predictive evaluator whether one or more conditions in respect of one or more vehicle operating parameters are met when the amount of wheel slip is below the first prescribed threshold may comprise determining by means of the predictive evaluator whether one or more conditions in respect of one or more vehicle operating parameters are met indicating that the amount of wheel slip may be about to exceed a second prescribed threshold when the amount of wheel slip is below the first prescribed threshold Optionally the step of determining by means of the predictive evaluator whether one or more conditions in respect of one or more vehicle operating parameters are met when the amount of wheel slip is below the first prescribed threshold may comprise determining by means of the predictive evaluator whether one or more conditions in respect of one or more vehicle operating parameters are met indicating that a passenger discomfort parameter may be about to exceed a prescribed threshold when the amount of wheel slip is below the first prescribed threshold.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
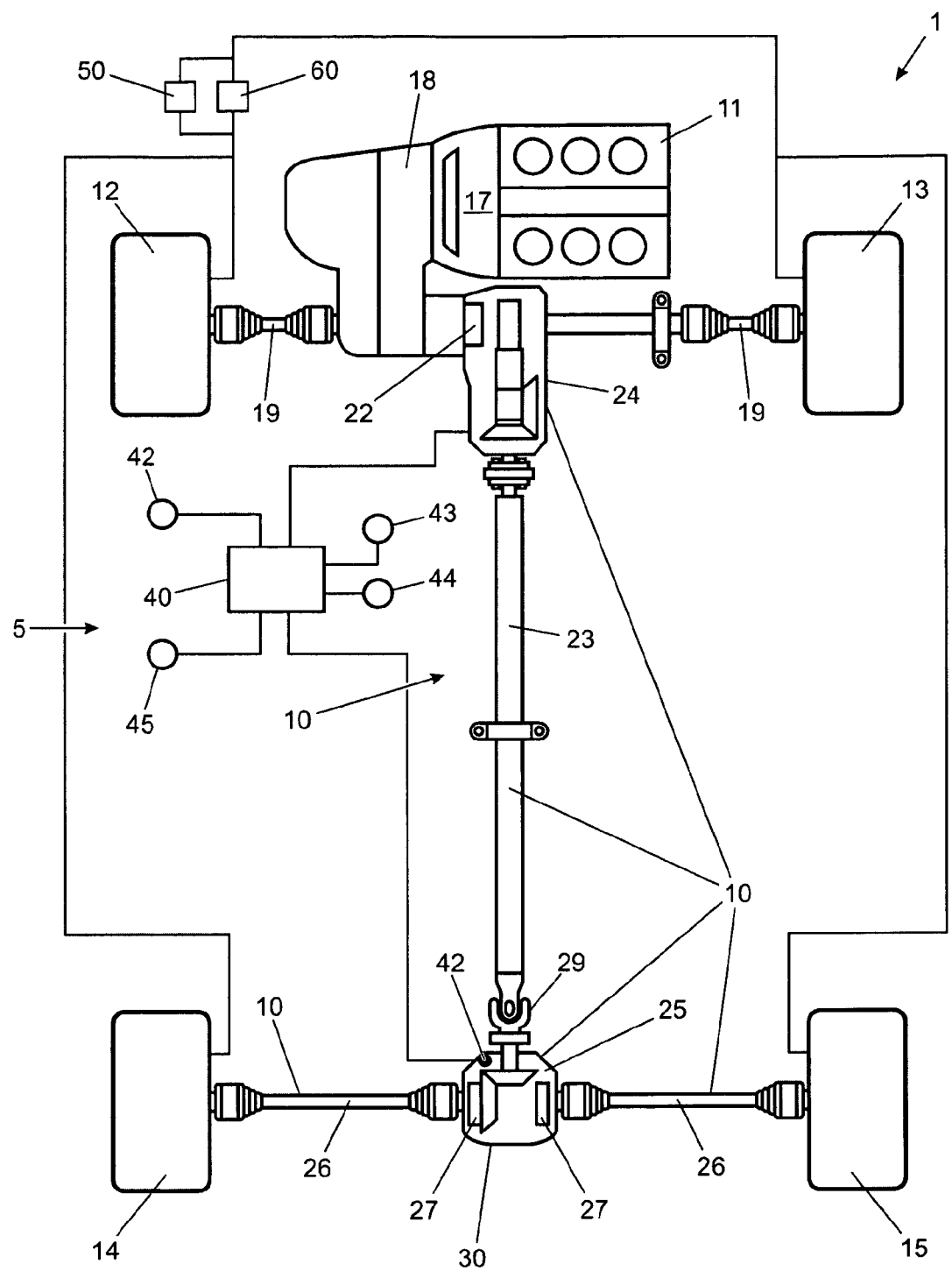
FIG. 1 is a schematic illustration of a vehicle according to an embodiment of the present invention.

FIG. 1 is a schematic illustration of a motor vehicle 1 having a driveline 5 according to an embodiment of the present invention. The driveline 5 is connected to an internal combustion engine 11 and has a gear box 18, a pair of front wheels 12, 13, an auxiliary portion 10 and a pair of rear wheels 14, 15.

The driveline 5 is arranged selectively to transmit power supplied to the gearbox 18 from the internal combustion engine 11 to the front wheels 12, 13 only in a first (or two wheel drive) mode of operation or to the front wheels 12, 13 and the rear wheels 14, 15 simultaneously in a second (or four wheel drive) mode of operation.

Power is transmitted to the front wheels 12, 13 via a pair of front drive shafts 19 of the driveline 5.

Power is transmitted to the rear wheels 14, 15 by means of the auxiliary portion 10. The auxiliary portion 10 has a power transfer unit (PTU) 24 having a power transfer clutch (PTC) 22 operable to connect a prop shaft 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTC 22 and clutches 27. When a four wheel drive mode of operation is required the controller 40 is arranged to close the PTC 22 and to close clutches 27 of the differential 30.

In the embodiment of FIG. 1 the PTC 22 and differential clutches 27 have respective actuators operable to close the respective clutches at a selected one of a plurality of different rates. This allows the transition from the two wheel drive mode of operation to the four wheel drive mode of operation to be made at one of a corresponding plurality of different rates.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of the vehicle 1. Thus, in the interests of driver comfort and vehicle longevity it may be preferable in some embodiments to perform a transition from the two wheel drive mode of operation to the four wheel drive mode of operation at a slower rate in order to reduce component wear and reduce vehicle NVH.

However in some situations it is preferable to perform the transition from the two wheel drive mode to the four wheel drive at a higher rate. For example, if it is detected that the vehicle is skidding it may be preferable to assume the four wheel drive mode quickly.

The vehicle 1 also has an antilock braking system (ABS) arranged to control a brake of one or more wheels of the vehicle to reduce an amount of braking action when required when braking is performed in order to prevent skidding. The vehicle 1 also has a dynamic stability control system (DSC) 60 arranged to control an amount of torque delivered to one or more wheels of the vehicle to prevent wheel slip.

Furthermore, the vehicle 1 has a traction control system (TCS) 70 arranged to monitor wheels of the vehicle 1 and to apply a brake to one or more wheels in the event that it is determined that the wheel is rotating at a speed that is higher than that required for substantially no wheel slip to occur.

Figure 2:
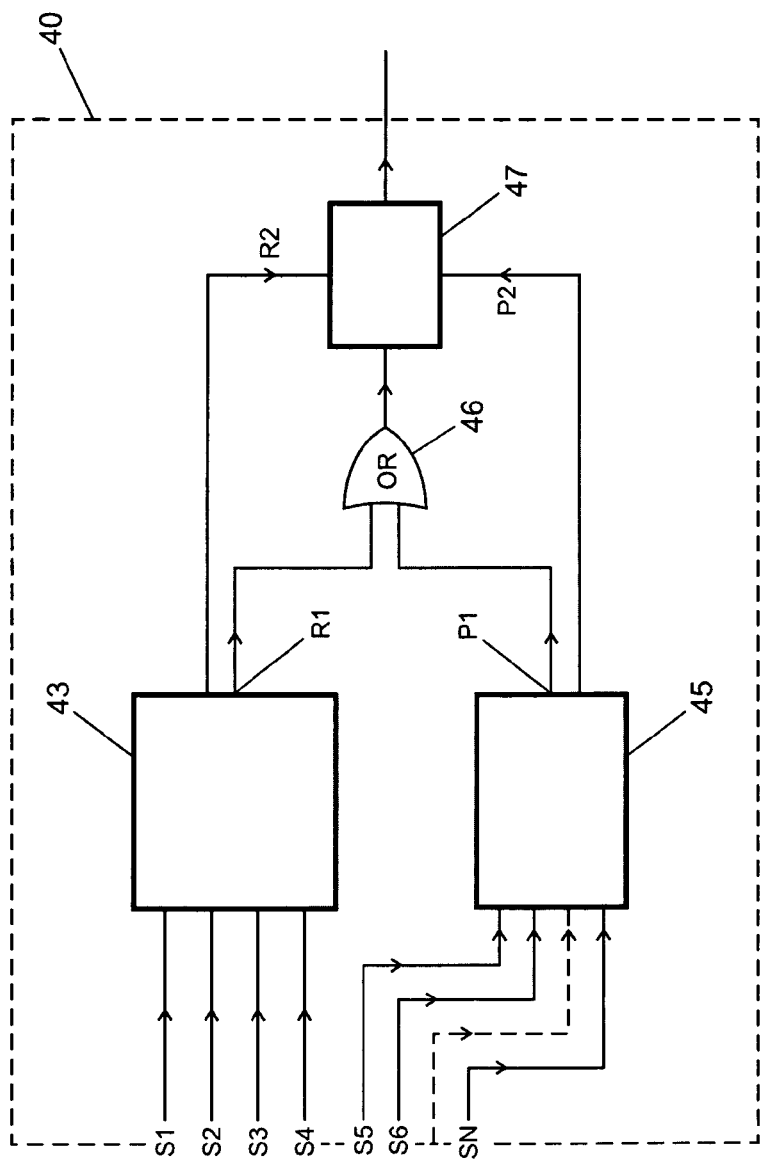
FIG. 2 is a schematic diagram of a controller of a motor vehicle according to an embodiment of the present invention.

FIG. 2 is a schematic illustration of a portion of the controller 40. The controller 40 has a reactive evaluator 43 embodied in computer software code that is run by a computing device of the controller 40. The reactive evaluator 43 is arranged to evaluate signals S1, S2, S3, S4, S5 received by the controller 40. The signals are responsive to:

(a) an amount of longitudinal wheel slip of one or more wheels, (b) a yaw rate error, (c) a determination whether an antilock braking system (ABS) 50 is active;

(d) a determination whether a dynamic stability control system (DSC) 60 is active; and (e) a determination whether a traction control system (TCS) 70 is active.

When the vehicle 1 is in the two wheel drive mode of operation and one or more values of the signals S1, S2, S3, S4, S5 meet a set of one or more prescribed reactive evaluator conditions, the reactive evaluator 43 is arranged to trigger a transition from the two wheel drive mode to the four wheel drive mode.

In order to trigger the transition from the two wheel drive mode to the four wheel drive mode the reactive evaluator 43 provides an output signal R1 to a control module 47 that controls the state of the driveline 5, i.e. whether the driveline 5 is in the two wheel drive mode or the four wheel drive mode.

In the embodiment of FIG. 2 the output signal R1 is provided to the control module 47 via a logical OR gate 46.

The reactive evaluator 43 is arranged to determine when conditions actually exist that require the four wheel drive mode to be assumed immediately.

In the present embodiment, when the reactive evaluator 43 determines that the amount of longitudinal wheel slip exceeds a prescribed threshold, or the amount of yaw rate error (indicting lateral wheel slip) exceeds a prescribed threshold the vehicle is arranged to assume the four wheel drive mode immediately and at a relatively rapid rate.

Similarly, if the reactive evaluator 43 determines that any one of ABS system 50, DSC system 60 and TCS system 70 is active the reactive evaluator 43 controls the vehicle to assume the four wheel drive mode at a relatively rapid rate. In some embodiments the reactive evaluator 43 is arranged to determine a severity of the response of the ABS system 50, DSC system 60 and/or TCS system 70 before deciding whether to trigger a transition to the second mode.

The reactive evaluator 43 provides a control signal R2 to a control module 47 configured to control the vehicle to transition between the two wheel drive and four wheel drive modes. The control signal R2 is responsive to the rate at which the transition from the two wheel drive mode to the four wheel drive mode should be made. Thus the control module 47 is able to determine when and at what rate a transition to the four wheel drive mode is required.

The controller 40 also has a predictive evaluator 45 embodied in computer software code that is run by a computing device of the controller 40. In the embodiment shown in FIG. 2 the computing device is the same computing device as the device running the software embodying the reactive evaluator 43. Alternatively the computing device may be a different computing device.

Like the reactive evaluator 43, the predictive evaluator 45 is also arranged to evaluate signals (signals S6, . . . , SN) received by the controller 40 corresponding to the values of different respective vehicle operating parameters.

However, rather than determining when conditions actually exist for which four wheel drive operation is required as in the case of the reactive evaluator 43, the predictive evaluator 45 is arranged to determine when conditions exist that indicate that a transition from the two wheel drive mode to the four wheel drive mode is likely to be required within a prescribed period of time based on the values of one or more operating parameters, which may be:

(a) an instantaneous amount of torque being delivered through the driveline to one or more wheels, (b) a steering wheel angle, (c) a steerable road wheel angle, (d) a rate of change of steerable road wheel angle, (e) a rate of change of steering wheel, (f) a lateral acceleration of the vehicle, (g) a rate of change of lateral acceleration, (h) a throttle or accelerator pedal position, (i) a rate of change of throttle or accelerator pedal position, (j) a driver demanded torque, (k) a prime mover means torque, (l) an amount of wheel slip, (m) a vehicle acceleration, (n) a vehicle deceleration, (o) a yaw rate, (p) a yaw rate error, (q) a gear shift position value of a manual or automatic gear shift control, (r) an operating temperature, (s) an ambient temperature, (t) a temperature of a vehicle component, (u) a temperature of a vehicle fluid, (v) a temperature of a component of the auxiliary driveline, (w) a temperature of a fluid of the auxiliary driveline, (x) a speed of the vehicle, (y) the identity of a vehicle operating program being executed by the vehicle, (z) a roughness of a driving surface over which the vehicle is moving, (a1) a current or target gear of an automatic transmission, (b1) a brake pedal position value is greater than a first prescribed brake pedal position threshold, and (c1) a brake pressure value is greater than a first prescribed brake pressure threshold.

The predictive evaluator 45 may also have as an input one or more of the signals fed to the reactive evaluator.

It is to be understood that in some embodiments the predictive evaluator 45 may be arranged to determine one or more of the above operating parameters (such as yaw rate error) based on the value of one or more other operating parameters rather than receiving an input signal specifically representing the value of that parameter.

When the predictive evaluator 45 determines that a transition from the first mode to the second mode is likely to be required the predictive evaluator 45 is arranged to provide an output signal P1 to trigger a transition from the two wheel drive mode to the four wheel drive mode.

As shown in FIG. 2, the output signal P1 of the predictive evaluator 45 is combined with the output signal R1 of the reactive evaluator 43 in the logical OR operation performed by the logical OR operator 46. The output of the logical OR operator 46 is fed to control module 47 which controls the vehicle to transition to the second mode as described above.

Thus the vehicle 1 may be arranged (by means of the predictive evaluator 45) to assume the four wheel drive mode in advance of conditions actually occurring that would cause the reactive evaluator 43 to trigger a transition to the four wheel drive mode.

In some embodiments the predictive evaluator 45 is arranged to determine a probability that a transition to the four wheel drive mode will be required and to generate an output responsive to the probability so determined.

It can be seen in FIG. 2 that the predictive evaluator also provides an output signal P2 to the control module 47. The output signal P2 is recognised by the control module 47 as indicating that the transition from the two wheel drive mode to the four wheel drive mode has been triggered by the predictive evaluator 45. The control module 47 may therefore control the vehicle to transition to the four wheel drive mode at a corresponding rate. This rate may be lower than the rate required by the reactive evaluator 43.

In some embodiments control line P2 may also provide an indication as to the rate at which the transition to the four wheel drive mode should be made.

In some embodiments the control module 47 also checks control signal line R2 to see if the reactive evaluator 43 has also triggered the vehicle 1 to assume the four wheel drive mode. If the value of R2 indicates that a higher rate of connection is required than that which would otherwise be employed by the control module 47 responsive to P2, the control module 47 controls the vehicle 1 to assume the four wheel drive mode at the higher rate required by control signal R2.

Thus if the reactive and predictive evaluators both trigger a transition to the four wheel drive mode substantially simultaneously and prescribe different respective rates, the control module 47 is arranged to trigger the transition to the four wheel drive mode at the higher of the two rates.

In some embodiments the vehicle is configured such that if whilst a transition to the second mode is occurring at one rate, a control input is received requesting a transition at a higher rate, the vehicle continues the transition at the higher of the two rates.

Examples of conditions that may cause the predictive evaluator 45 to trigger a transition from the two wheel drive mode to the four wheel drive mode include (a) the condition that the amount of torque applied to a stationary wheel of the vehicle exceeds a prescribed value (suggesting the vehicle may be seeking to launch whilst on a hill with a heavy load and therefore an increased risk of skidding exists) and (b) that the speed of the vehicle exceeds a prescribed value for a given steerable road wheel angle (suggesting the vehicle is cornering at speed with an increased risk of skidding).

It is to be understood that the reactive evaluator 43 may not trigger a transition to the four wheel drive mode under condition (a) since the wheel is not actually slipping. It is to be further understood that the fact that the predictive evaluator 45 determines that a risk of wheel slip exists and triggers the transition to the four wheel drive mode of operation before wheel slip actually takes place reduces a risk that the vehicle 1 will subsequently experience wheel slip (longitudinal or lateral).

It is to be understood that the reactive evaluator 43 may also not trigger a transition to the four wheel drive mode under condition (b) above if the vehicle 1 is not actually skidding as it negotiates a corner. Again, the fact that the predictive evaluator 45 determines that a risk of skidding exists and triggers the transition to the four wheel drive mode of operation before a skid actually takes place reduces a risk that the vehicle 1 will experience wheel slip (longitudinal or lateral) as it negotiates the corner.

It is to be understood that the reactive evaluator 43 is required to process a substantial amount of information continually in order to determine whether or not conditions requiring an immediate transition from the two wheel drive mode to the four wheel drive mode exist.

By providing a predictive evaluator 45 in addition to the reactive evaluator 43, the reactive evaluator 43 may continue rapidly to process vehicle operating condition information in respect of whether an immediate transition from the two wheel drive mode to the four wheel drive mode is required whilst the predictive evaluator 45 performs potentially more sophisticated calculations in respect of the values of vehicle operating parameters in order to determine whether conditions are likely to exist in the future that will require a transition to the four wheel drive mode.

It is to be understood that wheel slip is undesirable at least in part because excessive wear of tyres or one or more other components of the driveline 5 may occur as well as damage to the driving surface. A vehicle may become immobilised on a driving surface following a wheel spin event in which the surface is modified sufficiently to prevent traction.

It is to be understood that the predictive evaluator 45 may perform more sophisticated calculations taking a longer period of time to complete than those of the reactive evaluator 43 without compromising a response time of the vehicle 1 in assuming the four wheel drive mode responsive to the existence of wheel slip because the reactive evaluator 43 continues to function in parallel with the predictive evaluator 45.

In some embodiments the predictive evaluator 45 is arranged to determine whether a transition to the four wheel drive mode may be required responsive to a history of a driving style of a driver of the vehicle 1. Thus if the predictive evaluator 45 determines that wheel slip is occurring frequently when the vehicle 1 first launches from a stationary condition, the predictive evaluator 45 may be arranged to control the vehicle automatically to assume the four wheel drive mode of operation when the vehicle is stationary. The predictive evaluator 45 may be arranged to consider the history of the driving style of the user over a prescribed historical time period or a prescribed number of previous drivecycles. Other arrangements and configurations are also useful.

Similarly, the predictive evaluator 45 may determine that an amount of lateral acceleration of the vehicle 1 is fluctuating repeatedly between relatively high values and relatively low values. Such fluctuations may suggest for example that the vehicle 1 is negotiating a winding road. The predictive evaluator 45 may therefore control the vehicle 1 to assume the four wheel drive mode on the basis that an increased probability exists that the reactive evaluator 43 will trigger a transition to the four wheel drive mode of operation.

The historical time period over which evaluation takes place may be a period of the order of a few seconds, a few minutes, a few tens of minutes, a few hours, a few days, a few weeks or any other suitable period of time. The length of the historical time period employed may also be responsive to the particular operating parameter(s) under consideration.

In some embodiments, the reactive evaluator 43 is arranged only to output a signal requesting a transition to the second mode at a relatively high rate when it determines that a transition to the second mode is required. In contrast, the predictive evaluator 45 may be arranged to output a signal requesting a transition to the second mode at either a relatively high rate or a relatively low rate when the predictive evaluator 45 determines that a transition to the second mode is required.

The relatively high rate instructed by the reactive evaluator 43 may be substantially the same as the relatively high rate instructed by the predictive evaluator 45. Alternatively it may be higher or greater.

In some embodiments the predictive evaluator 45 is arranged to output a signal requesting a relatively fast transition if the predictive evaluator 43 determines that the transition to the second mode should be made and prescribed conditions are met in respect of one or more of the accelerator pedal position, the engine speed and the currently selected gear.

If the prescribed conditions are not met, the predictive evaluator 45 is arranged to output a signal requesting a relatively slow transition if the predictive evaluator 45 determines that the transition to the second mode should be made.

In some arrangements, if the accelerator pedal position exceeds a prescribed position when the vehicle 1 is in a prescribed gear and the engine speed is above a prescribed speed the predictive evaluator 45 is arranged to request a transition at a relative high rate. For example, if the engine speed exceeds 3000 revolutions per minute (rpm) or any other suitable number.

The critical throttle position may vary with selected gear. For example the critical position may be 70% depression when in first gear, 80% depression when in second gear and 95% depression when in third gear. Other depression values are also useful.

Other arrangements are also useful in respect of triggering by the reactive evaluator 43 or the predictive evaluator 45 a transition from the first mode to the second mode.

It is to be understood that reference to a 'relatively high' (or 'HIGH') rate is to be understood to be reference to a rate that is higher than a 'relatively low' (or 'LOW') rate, and reference to a 'relatively low' (LOW) rate is to be understood to be reference to a rate that is lower than a 'relatively high' (HIGH) rate.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102825.5 filed 18 Feb. 2011, the entire contents of which are expressly incorporated by reference herein.

The invention claimed is:

1. A motor vehicle having:
    a prime mover means;
    at least first and second groups of one or more wheels; and
    a driveline operable to connect the prime mover means to the first and second groups of one or more wheels such that the first group and not the second group of one or more wheels is driven by the prime mover means when the driveline is in a first mode of operation and the first and second groups are driven by the prime mover means when the driveline is in a second mode of operation,
    the driveline including an auxiliary portion comprising releasable torque transmitting means by means of which the driveline is operable under control of a controller to connect the second group of one or more wheels to the prime mover means when the driveline transitions from the first mode to the second mode,
    wherein when in the first mode the driveline is operable to transition to the second mode under the control of the controller, the controller being actuable to cause a transition of the driveline from the first mode to the second mode responsive to an output of a reactive evaluator indicative of a current need to assume the second mode,
    the controller being further actuable to cause a transition from the first mode to the second mode responsive to an output of a predictive evaluator indicative of a likely need to assume the second mode within a prescribed period of time,
    the output of the reactive evaluator being responsive to a determination whether an amount of wheel slip has exceeded a first prescribed threshold,
    the output of the predictive evaluator being responsive to a determination whether one or more conditions in respect of one or more vehicle operating parameters are met when the amount of wheel slip is below the first prescribed threshold,
    the controller being further actuable to cause a transition of the driveline from the first mode to the second mode at a rate responsive to at least one of the outputs of said reactive evaluator and said predictive evaluator, and
    wherein when the predictive evaluator determines that the second mode should be assumed, the predictive evaluator is arranged to provide the output indicative of the rate at which the transition from the first mode to the second mode should be made.

2. A vehicle as claimed in claim 1 wherein the output of the predictive evaluator is further responsive to a determination that one or more conditions in respect of one or more vehicle operating parameters are met indicating that the amount of wheel slip may be about to exceed a second prescribed threshold.

3. A vehicle as claimed in claim 2 wherein the second threshold is substantially equal to the first threshold.

4. A vehicle as claimed in claim 2 wherein the second threshold is less than the first threshold.

5. A vehicle as claimed in claim 1 wherein the output of the predictive evaluator is further responsive to a determination that one or more conditions in respect of one or more vehicle operating parameters are met indicating that a passenger discomfort parameter may be about to exceed a prescribed threshold.

6. A vehicle as claimed in claim 1 wherein the amount of wheel slip includes the amount of lateral wheel slip.

7. A vehicle as claimed in claim 6 wherein the amount of wheel slip includes the amount of longitudinal wheel slip.

8. A vehicle as claimed in claim 7 wherein the amount of wheel slip is determined according to a combination of the amount of lateral wheel slip and the amount of longitudinal wheel slip.

9. A vehicle as claimed in claim 1 wherein the predictive evaluator is arranged to determine a likelihood that a transition from the first mode to the second mode will be required within a prescribed period of time based on the value of the one or more vehicle operating parameters.

10. A vehicle as claimed in claim 1 wherein the predictive evaluator is arranged to provide an output responsive to one or more historical values of the one or more parameters.

11. A vehicle as claimed in claim 1 wherein when a transition from the first mode to the second mode is made responsive to the output of the predictive evaluator the releasable torque transmitting means is arranged to connect the second group of wheels to the prime mover means at a rate in dependence on the value of the one or more vehicle operating parameters responsive to which the predictive evaluator has triggered the transition.

12. A vehicle as claimed in claim 1 wherein the output of the predictive evaluator is responsive to a plurality of vehicle operating parameters.

13. A vehicle as claimed in claim 12 wherein the releasable torque transmitting means is arranged to connect the second group of wheels to the prime mover means at a rate responsive to the identity of the one or more operating parameters responsive to which the output of the predictive evaluator triggered the vehicle to transition from the first mode to the second mode.

14. A vehicle as claimed in claim 12 wherein when the predictive evaluator provides an output indicating that the second mode of the driveline should be assumed the predictive evaluator is further configured to provide an output corresponding to the identity of the one or more operating parameters responsive to which the predictive evaluator has provided the output indicating that the second mode should be assumed.

15. A vehicle as claimed in claim 1 wherein the predictive evaluator is configured to provide an output corresponding to a required mode of operation of the driveline.

16. A vehicle as claimed in claim 1 wherein the predictive evaluator is configured to provide an output corresponding to a likelihood that a transition from the first mode to the second mode will be required.

17. A vehicle as claimed in claim 16 wherein the output comprises a probability value being a value corresponding to a probability that a transition from the second mode to the first mode will be required within a prescribed time period.

18. A vehicle as claimed in claim 1 arranged to perform the transition from the first mode to the second mode at a slower rate when the transition to the second mode is made responsive to the output of the predictive evaluator compared with a transition made responsive to the output of the reactive evaluator.

19. A vehicle as claimed in claim 1 wherein the reactive evaluator is responsive to at least one vehicle operating parameter selected from amongst:
    (a) an amount of wheel slip,
    (b) a yaw rate error,
    (c) a determination whether an antilock braking system (ABS) is active;
    (d) a determination whether a dynamic stability control (DSC) system is active; and
    (e) a determination whether a traction control system (TCS) is active.

20. A vehicle as claimed in claim 1 wherein the predictive evaluator is responsive to at least one vehicle operating parameter selected from amongst:
    (a) an instantaneous amount of torque being delivered through the driveline to one or more wheels,
    (b) a steering wheel angle,
    (c) a steerable road wheel angle,
    (d) a rate of change of steerable road wheel angle,
    (e) a rate of change of steering wheel,
    (f) a lateral acceleration of the vehicle,
    (g) a rate of change of lateral acceleration,
    (h) a throttle or accelerator pedal position,
    (i) a rate of change of throttle or accelerator pedal position,
    (j) a driver demanded torque,
    (k) a prime mover means torque,
    (l) an amount of wheel slip,
    (m) a vehicle acceleration,
    (n) a vehicle deceleration,
    (o) a yaw rate,
    (p) a yaw rate error,
    (q) a gear shift position value of a manual or automatic gear shift control,
    (r) an operating temperature,
    (s) an ambient temperature,
    (t) a temperature of a vehicle component,
    (u) a temperature of a vehicle fluid,
    (v) a temperature of a component of the auxiliary driveline,
    (w) a temperature of a fluid of the auxiliary driveline,
    (x) a speed of the vehicle,
    (y) the identity of a vehicle operating program being executed by the vehicle,
    (z) a roughness of a driving surface over which the vehicle is moving,
    (a1) a current or target gear of an automatic transmission is set to one of a first set of one of one or more gear values,
    (b1) a brake pedal position value is greater than a first prescribed brake pedal position threshold, and
    (c1) a brake pressure value is greater than a first prescribed brake pressure threshold.

21. A vehicle as claimed in claim 1 wherein the auxiliary portion of the driveline comprises a prop shaft and the releasable torque transmitting means comprises first releasable torque transmitting means operable to connect the prop shaft to a torque transmission path from the prime mover means and the second releasable torque transmitting means is operable to connect the prop shaft to the second group of one or more wheels.

22. A vehicle as claimed in claim 21 further comprising control means operable to switch the vehicle between the first and second modes of operation such that in the first mode the first and second releasable torque transmission means disconnect the prop shaft from both the torque transmission path to the prime mover means and the second group of one or more wheels.

23. A vehicle as claimed in claim 1 wherein the first group of wheels comprises a first pair of wheels and the first mode corresponds to a two wheel drive mode of operation wherein the first pair of wheels are driven by the prime mover means.

24. A vehicle as claimed in claim 1 wherein the second group of wheels comprise a second pair of wheels and the second mode of operation corresponds to a four wheel drive mode of operation.

25. A vehicle as claimed in claim 1 wherein the second group of wheels comprises a second and a third pair of wheels and the second mode of operation corresponds to a six wheel drive mode of operation.

26. A vehicle as claimed in claim 1 wherein at least one of the first and second groups of wheels comprises a plurality of pairs of wheels.

27. A vehicle as claimed in claim 1 wherein the releasable torque transmitting means comprises one or more actuators arranged to perform the connection operation, the connection operation rate being dependent on a rate of movement of the one or more actuators.

28. A vehicle as claimed in claim 1 wherein the releasable torque transmitting means comprises a plurality of actuators arranged to perform the connection operation.

29. A method of controlling a motor vehicle having a driveline comprising:
    in a first mode of operation of the driveline, coupling a first group of one or more wheels to a prime mover means by means of the driveline,
    in a second mode of operation of the driveline, coupling a second group of one or more wheels to the prime mover means is addition to the first group by means of an auxiliary portion of the driveline,
    when the driveline is in the first mode the method comprising controlling the driveline to transition to the second mode responsive to an output of a reactive evaluator indicative of a current need to assume the second mode and a predictive evaluator indicative of a likely need to assume the second mode, the method comprising determining by means of the reactive evaluator whether an amount of wheel slip has exceeded a first prescribed threshold and controlling the driveline to assume the second mode if the amount of wheel slip has exceeded the first prescribed threshold, and determining by means of the predictive evaluator whether one or more conditions in respect of one or more vehicle operating parameters are met when the amount of wheel slip is below the first prescribed threshold and controlling the driveline to assume the second mode when the one or more conditions are met, the method further comprising controlling the driveline to transition from the first mode to the second mode at a rate responsive to at least one of the outputs of the reactive evaluator and the predictive evaluator, and wherein, when the driveline is controlled to transition to the second mode responsive to the output of the predictive evaluator, controlling said transition to be at the rate responsive to the output of the predictive evaluator.

30. A method as claimed in claim 29 wherein the step of determining by means of the predictive evaluator whether one or more conditions in respect of one or more vehicle operating parameters are met when the amount of wheel slip is below the first prescribed threshold comprises determining by means of the predictive evaluator whether one or more conditions in respect of one or more vehicle operating parameters are met indicating that the amount of wheel slip may be about to exceed a second prescribed threshold when the amount of wheel slip is below the first prescribed threshold.

31. A method as claimed in claim 30 wherein the step of determining by means of the predictive evaluator whether one or more conditions in respect of one or more vehicle operating parameters are met indicating that a passenger discomfort parameter may be about to exceed a prescribed threshold when the amount of wheel slip is below the first prescribed threshold.

32. A system for a vehicle having a driveline comprising a prime mover, at least a pair of rear wheels, a shaft for connecting the prime mover to the rear wheels and first and second coupling means for selectively connecting the prop shaft to the prime mover and to the rear wheels, respectively, the system comprising control means configured to control operation of the first and second coupling means in one of a first mode of operation, in which the prop shaft is disconnected from both the prime mover and the rear wheels, and a second mode of operation, in which the prime mover is connected to the rear wheels by the prop shaft, the control means being arranged to cause a transition from the first mode of operation to the second mode of operation in response to an output of a reactive evaluator indicative of a current need to assume the second mode and an output of a predictive evaluator indicative of a likely need to assume the second mode;

wherein the output of the reactive evaluator is dependent upon a determination whether an amount of wheel slip has exceeded a first prescribed threshold;

wherein the output of the predictive evaluator is dependent on a determination whether one or more conditions in respect of one or more vehicle operating parameters are met when the amount of wheel slip is below the first prescribed threshold; and wherein the control means is further arranged to cause a transition from the first mode to the second mode at a rate responsive to at least one of the outputs of the reactive evaluator and the predictive evaluator, and wherein, when the driveline is controlled to transition to the second mode responsive to the output of the predictive evaluator, the control means is arranged to control said transition to be at the rate responsive to the output of the predictive evaluator.

\* \* \* \* \*